(12) United States Patent
Duncan

(10) Patent No.: US 12,106,172 B1
(45) Date of Patent: Oct. 1, 2024

(54) SYSTEM FOR LOCATING PEOPLE IN A DEFINED AREA

(71) Applicant: Bruce Duncan, El Paso, TX (US)

(72) Inventor: Bruce Duncan, El Paso, TX (US)

( * ) Notice: Subject to any disclaimer, the term of this patent is extended or adjusted under 35 U.S.C. 154(b) by 0 days.

(21) Appl. No.: 18/195,736

(22) Filed: May 10, 2023

(51) Int. Cl.
*G06K 7/10* (2006.01)
(52) U.S. Cl.
CPC .................. *G06K 7/10366* (2013.01)
(58) Field of Classification Search
CPC . G06K 7/10366; G06K 19/07762; G07C 9/28
USPC ........................................................ 235/451
See application file for complete search history.

(56) References Cited

U.S. PATENT DOCUMENTS

| | | | |
|---|---|---|---|
| 6,424,264 B1 | 7/2002 | Giraldin | |
| 7,164,354 B1 | 1/2007 | Panzer | |
| 10,152,840 B2 * | 12/2018 | Geraghty | ........... G06K 7/10297 |
| 2003/0030561 A1 | 2/2003 | Yafuso | |
| 2005/0045710 A1 | 3/2005 | Burke | |
| 2013/0332509 A1 * | 12/2013 | Schwartz | ............... G07C 11/00 |
| | | | 709/203 |
| 2015/0109126 A1 | 4/2015 | Crawford | |
| 2016/0004953 A1 * | 1/2016 | Karani | ............. G06K 19/07758 |
| | | | 235/492 |
| 2020/0096599 A1 * | 3/2020 | Hewett | .................. G01S 5/0221 |

FOREIGN PATENT DOCUMENTS

JP        2006059226        3/2006

* cited by examiner

*Primary Examiner* — Ahshik Kim

(57) ABSTRACT

A location tracking system for tracking locations of individuals in a defined area such as an amusement park includes a plurality of location markers, each of which has a radio-frequency identification (RFID) tag with an identification code. Each location marker of the plurality of location markers is in wireless communication with at least one kiosk of a plurality of kiosks. The RFID tag of each location marker transmits identification signals to at least one kiosk of the plurality of kiosks. The kiosks are in communication with each other. The plurality of kiosks cooperatively determine a location of each location marker of the plurality of location markers via a location algorithm. A selected kiosk of the plurality of kiosks is configured for communicating a location of a chosen location marker of the plurality of location markers to a user.

8 Claims, 6 Drawing Sheets

SYSTEM FOR LOCATING PEOPLE IN A DEFINED AREA

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to location tracking system and more particularly pertains to a new location tracking system for tracking locations of individuals in a defined area such as an amusement park.

(2) Description of Related Art Including Information Disclosed Under 37 CFR 1.97 and 1.98

The prior art discloses myriad location tracking systems for tracking individuals in locations such as amusement parks and shopping malls. Such systems use identification markers which may include bracelets, lanyards, or the like so they can be worn by the individuals. Some of the location tracking systems of the prior art use radio-frequency identification (RFID) to track the identification markers. However, the prior art fails to describe such a system where transceivers for tracking RFID tags are housed in kiosks which the individuals may operate to locate another individual, pay for identification markers, and cause the kiosk to dispense the identification markers.

BRIEF SUMMARY OF THE INVENTION

An embodiment of the disclosure meets the needs presented above by generally comprising a plurality of location markers, each of which has a radio-frequency identification (RFID) tag with an identification code. Each location marker of the plurality of location markers is in wireless communication with at least one kiosk of a plurality of kiosks. The RFID tag of each location marker transmits identification signals to at least one kiosk of the plurality of kiosks. The kiosks are in communication with each other. The plurality of kiosks cooperatively determine a location of each location marker of the plurality of location markers via a location algorithm. A selected kiosk of the plurality of kiosks is configured for communicating a location of a chosen location marker of the plurality of location markers to a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
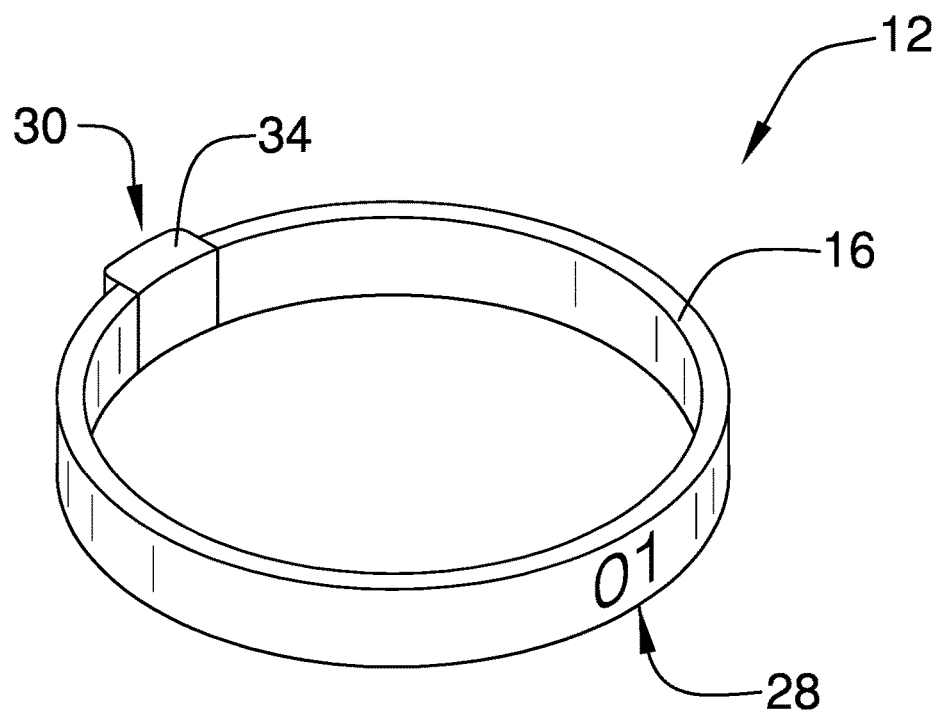
FIG. 1 is a top front side perspective view of an identification marker a location tracking system according to an embodiment of the disclosure.
Figure 2:
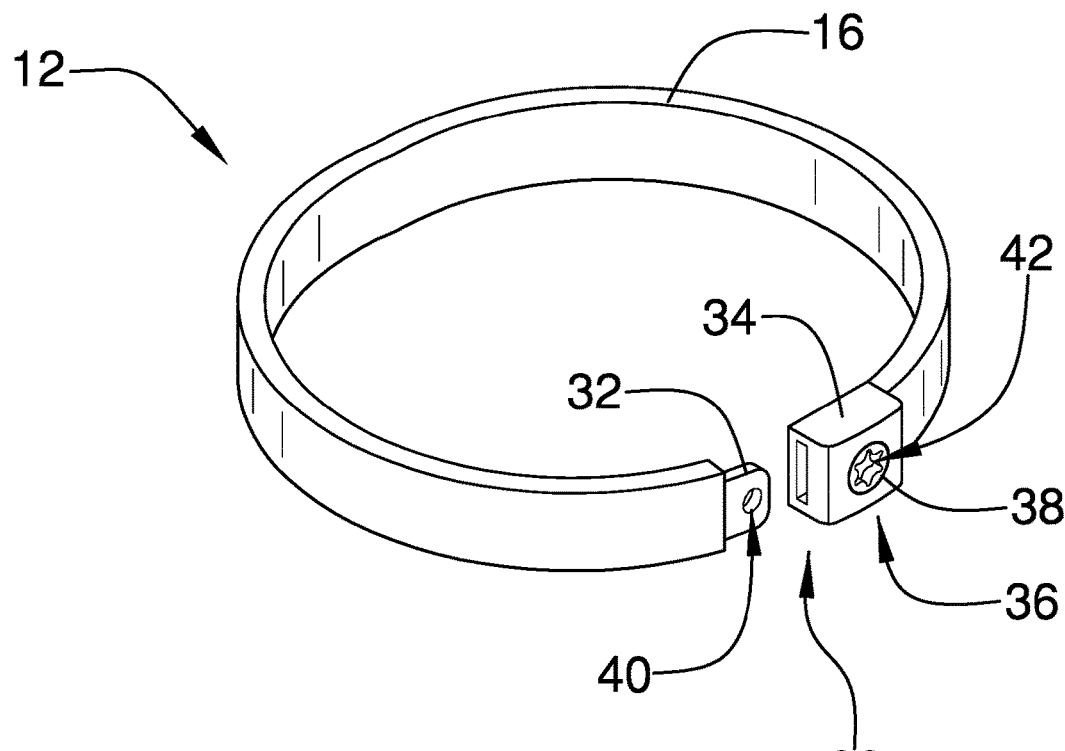
FIG. 2 is a top rear side perspective view of the identification marker of an embodiment of the disclosure.
Figure 3:
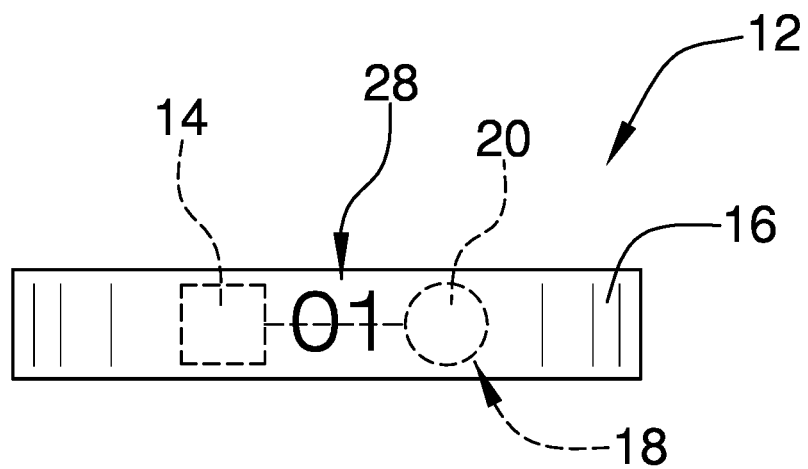
FIG. 3 is a front view of the identification marker of an embodiment of the disclosure.
Figure 4:
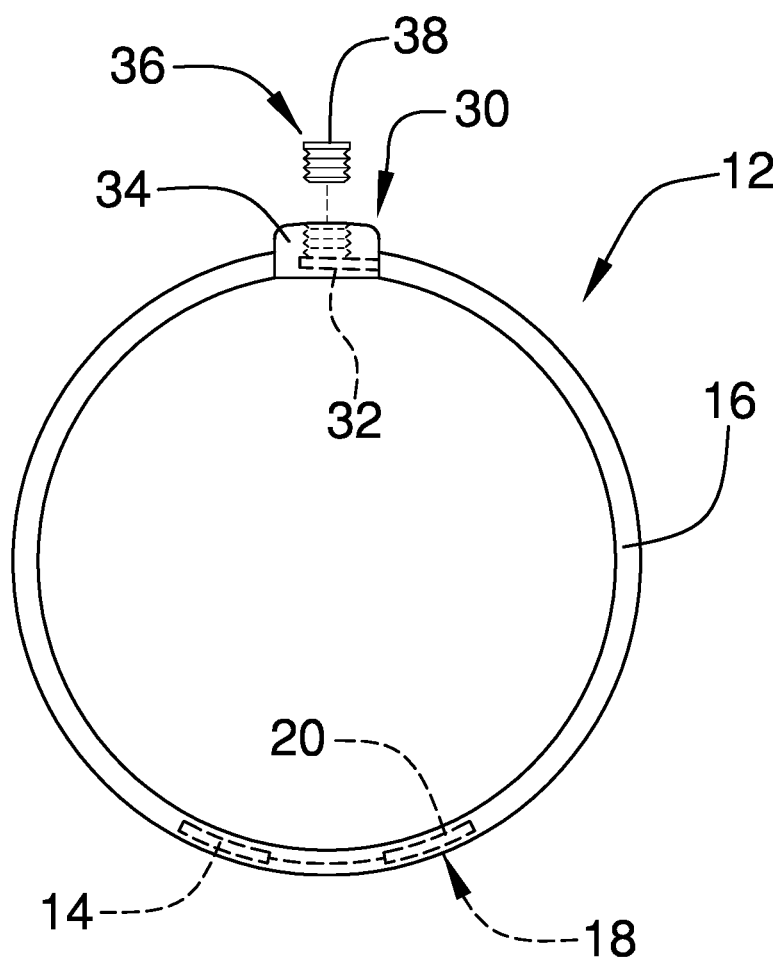
FIG. 4 is a bottom view of the identification marker of an embodiment of the disclosure.
Figure 5:
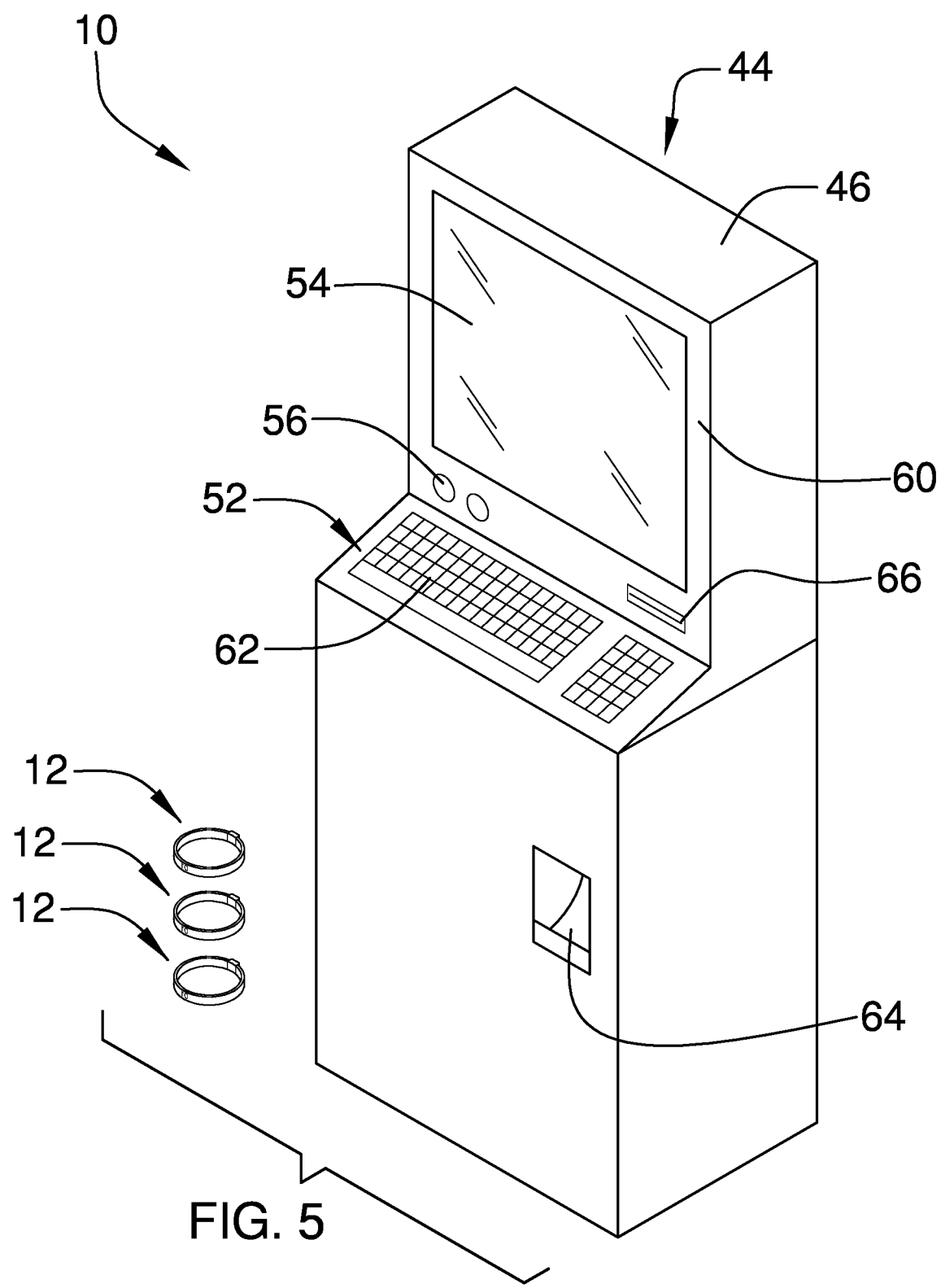
FIG. 5 is a perspective view of a kiosk and a plurality of identification makers of an embodiment of the disclosure.
Figure 6:
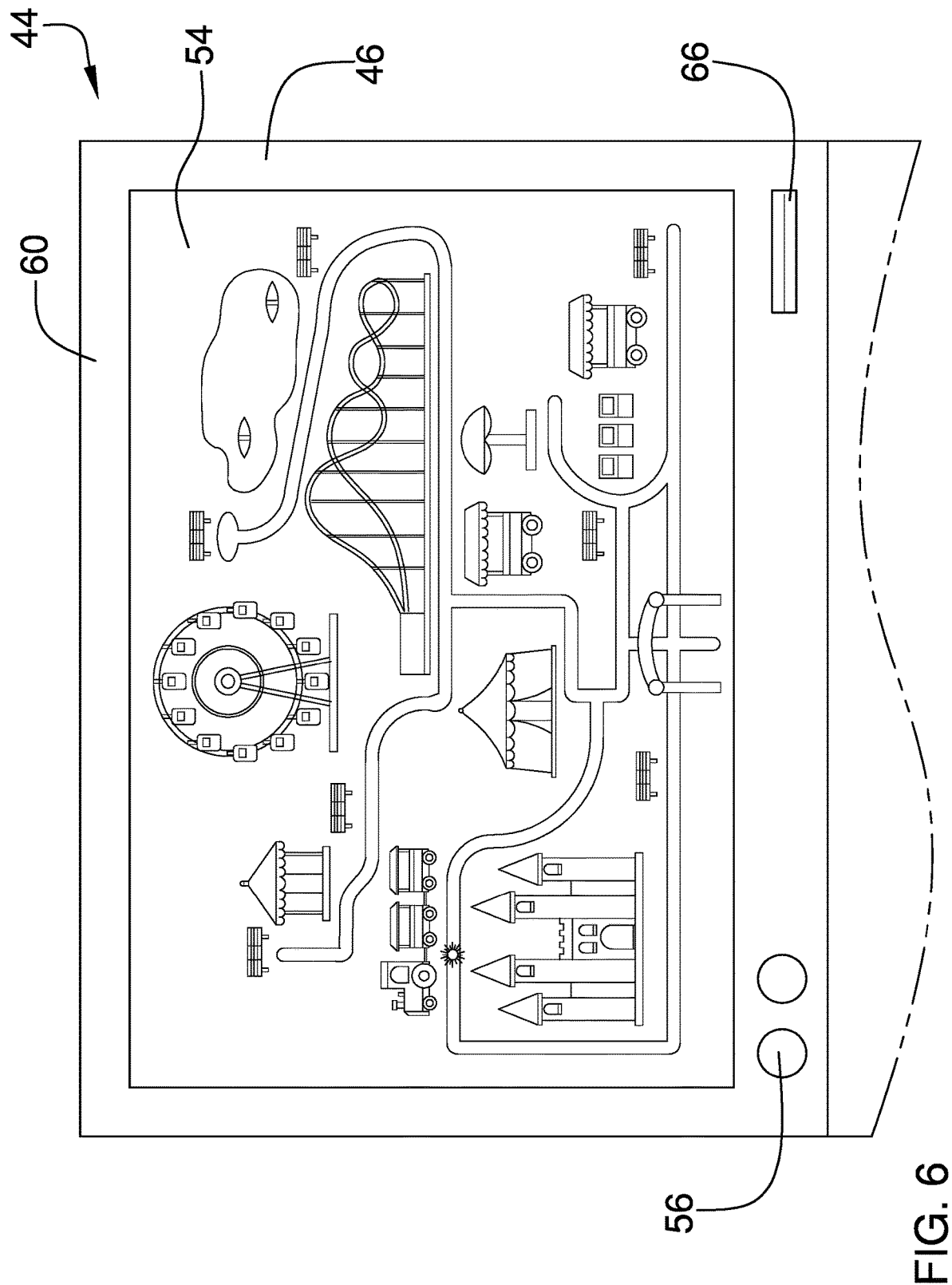
FIG. 6 is a front view of a display screen of a kiosk of an embodiment of the disclosure.
Figure 7:
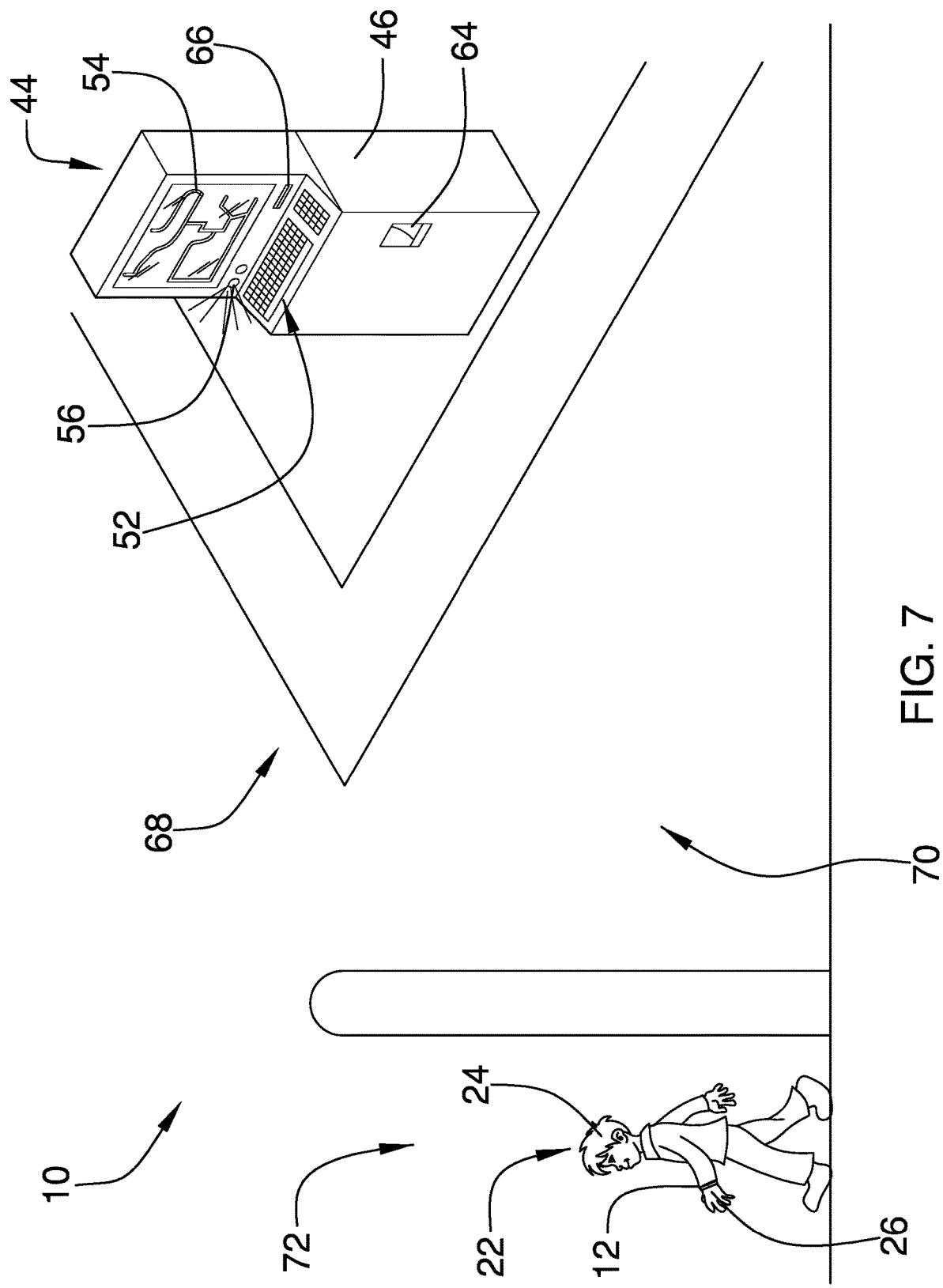
FIG. 7 is an in-use view of an embodiment of the disclosure.
Figure 8:
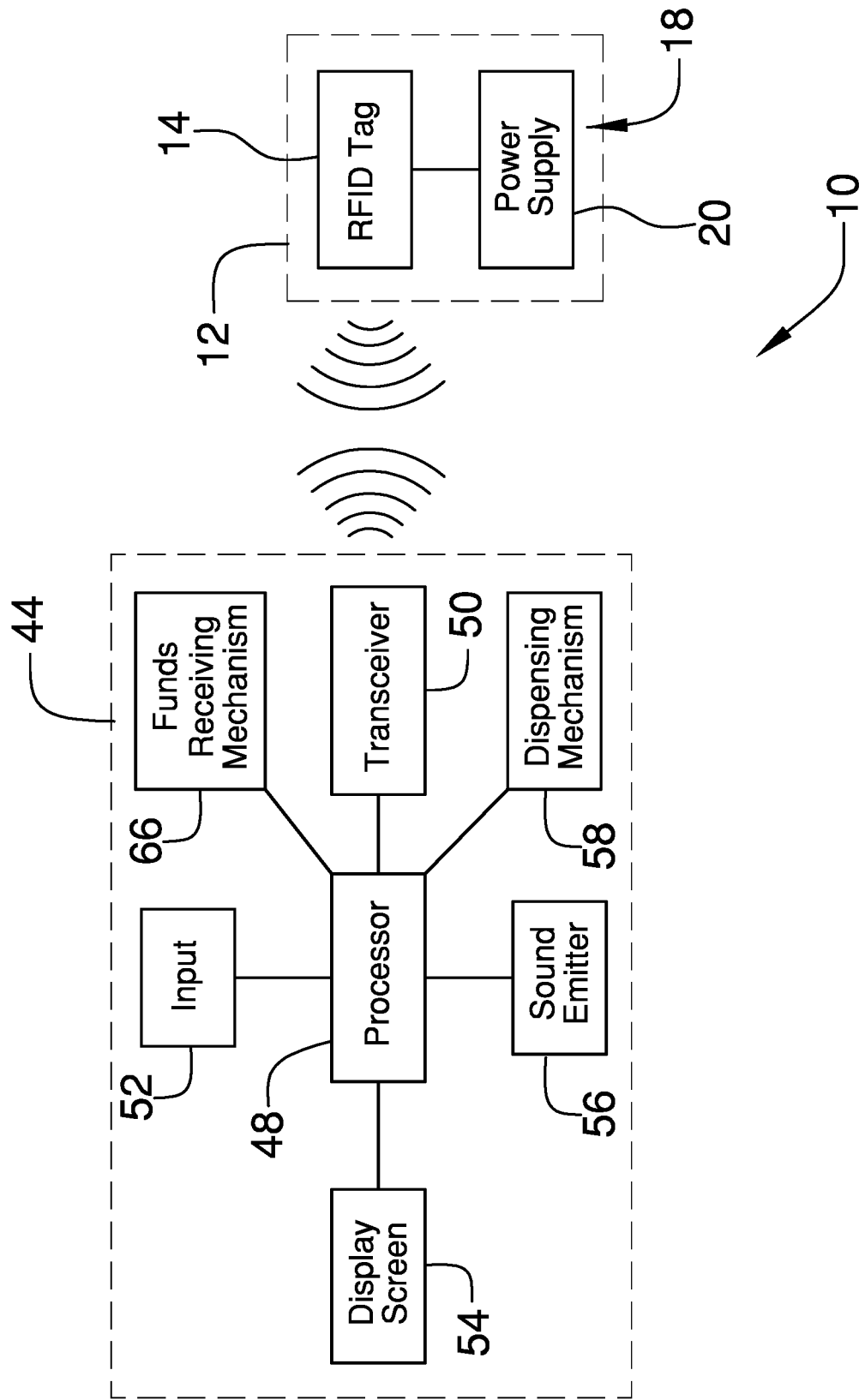
FIG. 8 is a block diagram of an embodiment of the disclosure.

With reference now to the drawings, and in particular to FIGS. 1 through 8 thereof, a new location tracking system embodying the principles and concepts of an embodiment of the disclosure and generally designated by the reference numeral 10 will be described.

As best illustrated in FIGS. 1 through 8, the location tracking system 10 generally comprises a plurality of location markers 12, each of which has a radio-frequency identification (RFID) tag 14. The RFID tag 14 of each location marker 12 has an identification code. Each location marker 12 of the plurality of location markers 12 comprises a bracelet 16 in which the RFID tag 14 is embedded. In some embodiments, each bracelet 16 may also include a power supply 18 comprising a battery 20 that is electrically coupled to the bracelet's 16 RFID tag 14 and is embedded within the bracelet 16. Each bracelet 16 has a size such that the bracelet 16 is configured to be worn on a wrist 26 of a selected individual 24 of a plurality of individuals 22 who are located in a defined area 68. In some cases, the defined area 68 may be an amusement park and the plurality of individuals 22 are guests at the amusement park. However, the defined area 68 may be any location where one of the individuals 22 may need to locate a friend, a family member, an associate, or the like. Such locations may include a cruise ship, a shopping mall, a museum, an office complex, or the like.

Each bracelet 16 also comprises an indicia 28 coupled to an outer surface 30 of the bracelet 16 which indicates the identification code. The term "indicia" is used in the specification and the claims to refer to either singular or multiple markings and may include information which is printed, embossed, etched, or the like. The indicia 28 need not contain the exact same information of the identification code and may be merely representative of the identification code. The indicia 28 may include alphanumeric characters, symbols, graphical images, shapes, or the like.

Each bracelet 16 further includes a clasp 30 which releasably couples a pair of ends of the bracelet 16 to each other. The clasp 30 comprises a male member 32, a female member 34, and a lock member 36 securing the male member 32 to the female member 34. The lock member 36 comprises a threaded fastener 38 which is received through a hole 40 extending through the male member 32 and has exterior threads that are complementary in shape to interior threads of the female member 34. The threaded fastener 38 may be rotated to remove the threaded fastener 38 from the hole 40 in the male member 32 and disconnect the male member 32 from the female member 34. The threaded fastener 38 may have a screw drive cavity 42 that is incompatible with typical screwdrivers such as flat-head screwdrivers and Phillips-head screwdrivers to limit unwanted tampering with the clasp 30.

A plurality of kiosks 44 is provided and may be dispersed throughout the defined area 68. Each location marker 12 of the plurality of location markers 12 is in wireless communication with at least one kiosk 44 of the plurality of kiosks 44 and transmits identification signals to at least one kiosk 44 of the plurality of kiosks 44. The kiosks 44 are in communication with each other. Each kiosk 44 of the plurality of kiosks 44 comprises a housing 46, a processor 48, a transceiver 50, an input 52, a display screen 54, a sound emitter 56, and a dispensing mechanism 58. the processor 48 is mounted to and positioned in the housing 46. The transceiver 50 is electrically coupled to the processor 48 and is configured for wirelessly communicating with the RFID tag 14 of each location marker 12. However, the kiosks 44 may be connected to a central processor. Depending on the embodiment, the kiosks 44 may communicate with each other via a wired or wireless network and may communicate through the central processor. The kiosks 44 may have independent power supplies or may each be coupled to a central power supply 18.

The input 52 is electrically coupled to the processor 48 and is positioned on an exterior 60 of the housing 46. The input 52 comprises a keypad 62 but may comprise a touchscreen, a microphone, a mouse, or the like. The sound emitter 56 is electrically coupled to the processor 48 and is positioned on the exterior 60 of the housing 46. The dispensing mechanism 58 is electrically coupled to the processor 48 and is positioned in the housing 46. The housing 46 contains a portion of the plurality of location markers 12 and selectively dispenses a selected location marker 12 of the plurality of location markers 12. The dispensing mechanism 58 is of a conventional type and may selectively make the selected location marker 12 available by conveying it to a dispensing platform 64, opening a door, or unlocking a door so that a user may access the selected location marker 12. Each kiosk 44 may also comprise a funds receiving mechanism 66 such as a currency slot, a credit card reader, or the like which is electrically coupled to the processor 48. The processor 48 permits dispensing of the selected location marker 12 only after sufficient payment is received by the funds receiving mechanism 66.

The plurality of kiosks 44 cooperatively determine a location of each location marker 12 of the plurality of location markers 12 via a location algorithm. The location algorithm comprises one of a choke point algorithm, a trilateration algorithm, and a triangulation algorithm, but may rely on an alternative algorithm. The term "choke point algorithm" as used in the specification and the claims refers to an algorithm which identifies the location of each location marker 12 by recording when the location marker 12 is within a predetermined range of a "choke point," which is a passage that the location marker 12 must pass through in order to be moved between a pair of zones within the defined area 68 given predefined constraints—structural or otherwise—on the movement of the location markers 12. For the purposes of the specification and the claims, a "choke point algorithm" may also identify a landmark which a given location marker 12 of the plurality of location markers 12 is positioned near even if movement of the given location marker 12 is not restricted to a passage as described.

The term "trilateration algorithm" as used in the specification and the claims refers to an algorithm which uses distances of the given location marker 12 from at least three distinct kiosks 44 to determine the location of the given location marker 12. The term "triangulation algorithm" as used in the specification and the claims refers to an algorithm which determines the location of the given location marker 12 based on the directions, including angles, of signal transmissions between the given location marker 12 and multiple kiosks 44 of the plurality of kiosks 44.

A selected kiosk 44 of the plurality of kiosks 44 is operable to display the location of a chosen location marker 12 of the plurality of location markers 12 via the display screen 54 of the selected kiosk 44. At least one kiosk 44 of the plurality of kiosks 44 also emits an audible alarm via the sound emitter 56 of the at least one kiosk 44 when one location marker 12 of the plurality of location markers 12 exits a permitted region 70. This function may be limited to one or more kiosks 44 positioned near passageways between the permitted region 70 and an unpermitted region 72. Kiosks 44 not positioned in such areas may not have a sound emitter 56.

The plurality of kiosks 44 may also be configured for wirelessly communicating to personal electronic devices such as mobile phones, tablets, smart watches, or the like via the transceiver 50 thereof. An application may be included in a memory of each of the personal electronic devices which is configured to control the processor 48 of one or more of the plurality of kiosks 44 or the central processor. Via the application, each personal electronic device may, for example, display the location of the given location marker 12 when the indicia 28 of the given location marker 12 is inputted into the personal electronic device. The application may also be used to monitor a selected group of location markers 12 of the plurality of location markers 12. For example, if each person in a group of people wants to be able to track the location of each other's location markers 12, each person in the group of people may monitor each of the location markers 12 used by the group of people.

In some embodiments, each one of the personal electronic devices may be integrated with an associated one of the plurality of location markers 12. In such embodiments, each location marker 12 of the plurality of location markers 12 will have an input means, such as a touchscreen, a microphone, a keypad, or the like, and an output means, such as a screen, a speaker, or the like.

In embodiments wherein the plurality of kiosks 44 are configured for communicating to personal electronic devices, the central processor or the processor 48 of each kiosk 44 of the plurality of kiosks 44 may also cause one or more of the personal electronic devices, via the application, to emit the audible alarm. The one or more personal electronic devices also may, for example, vibrate and display a visual notification when the one location marker 12 exits the permitted region 70. In the case of the defined area 68 being an amusement park, the permitted region 70 may include all areas within a boundary of the amusement park, and the unpermitted region 72 may include the areas outside the boundary. The permitted region 70 may include only certain areas within the boundary such as a zone encompassing amusement rides intended for children.

In use, the user operates one of the kiosks 44 to dispense the selected location marker 12, which is worn by a chosen individual 22 of the plurality of individuals 22. The user may be the chosen individual 22. In some embodiments, the location marker 12 does not include a bracelet 16 or other wearable component. In such cases, the location marker 12 is merely kept on the chosen individual 22's person, such as being placed in a pocket or a bag carried by the chosen individual 22. A screwdriver having a head matching the screw drive cavity 42 may be provided at each of the kiosks 44. If the chosen individual 22 becomes separated from family, friends, or associates, the location of the chosen individual 22 may be found by operating one of the kiosks 44 and inputting the indicia 28 to locate the location marker 12 worn by the chosen individual 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A location tracking system for a plurality of individuals in a defined area, the system comprising:
a plurality of location markers, each location marker of the plurality of location markers having a radio-frequency identification (RFID) tag, the RFID tag of each location marker having an identification code;
a plurality of kiosks, each location marker of the plurality of location markers being in wireless communication with at least one kiosk of the plurality of kiosks, the RFID tag of each location marker transmitting identification signals to at least one kiosk of the plurality of kiosks, the plurality of kiosks being in communication with each other,
wherein the plurality of kiosks cooperatively determine a location of each location marker of the plurality of location markers via a location algorithm; and
wherein a selected kiosk of the plurality of kiosks is configured for communicating a location of a chosen location marker of the plurality of location markers to a user;
wherein each location marker of the plurality of location markers comprises a bracelet having a loop shape, the RFID tag being embedded within the bracelet, the bracelet having a size such that the bracelet is configured to be worn on a wrist of a selected individual of the plurality of individuals;
wherein each location marker of the plurality of location markers comprises an indicia coupled to an outer surface of the bracelet, the indicia indicating the identification code;
wherein each location marker of the plurality of location markers comprises a clasp releasably coupling a pair of ends of the bracelet to each other;
wherein the clasp comprises:
a male member,
a female member receiving the male member, and
a lock member securing the male member to the female member; and
wherein the lock member comprises a threaded fastener, the male member having a hole extending therethrough, the threaded fastener extending through the hole of the male member, the threaded fastener having exterior threads complementary in shape to interior threads of the female member such that the threaded fastener is rotatable to exit the hole of the male member.

2. The system of claim 1, wherein each kiosk of the plurality of kiosks comprises:
a housing;
a processor being mounted to and positioned in the housing;
a transceiver being electrically coupled to the processor and being configured for wirelessly communicating with the RFID tag of each location marker of the plurality of location markers;
an input being electrically coupled to the processor and being positioned on an exterior of the housing, the input comprising a keypad; and
a display screen being electrically coupled to the processor and being positioned on the exterior of the housing, wherein the kiosk is operable to display a location of a chosen location marker of the plurality of location markers via the display screen of the selected kiosk.

3. The system of claim 1, wherein:
each kiosk of the plurality of kiosks further comprises a sound emitter being electrically coupled to the processor and being positioned on the exterior of the housing; and
at least one kiosk of the plurality of kiosks emits an audible alarm via the sound emitter of the at least one kiosk when one location marker of the plurality of location markers exits a permitted region.

4. The system of claim 1, wherein each kiosk of the plurality of kiosks further comprises a dispensing mechanism being electrically coupled to the processor and being positioned in the housing, the housing containing a portion of the plurality of location markers, the dispensing mechanism selectively dispensing a selected location marker of the plurality of location markers.

5. The system of claim 1, wherein each lock member of a plurality of lock members comprises a power supply being electrically coupled to the RFID tag and being embedded within the bracelet.

6. The system of claim 5, wherein the power supply is a battery.

7. The system of claim 1, wherein the location algorithm comprises one of a choke point algorithm, a trilateration algorithm, and a triangulation algorithm.

8. A location tracking system for a plurality of individuals in a defined area, the system comprising:
- a plurality of location markers, each location marker of the plurality of location markers having a radio-frequency identification (RFID) tag, the RFID tag of each location marker having an identification code, each location marker of the plurality of location markers comprising:
  - a bracelet having a loop shape, the RFID tag being embedded within the bracelet, the bracelet having a size such that the bracelet is configured to be worn on a wrist of a selected individual of the plurality of individuals;
  - an indicia coupled to an outer surface of the bracelet, the indicia indicating the identification code;
  - a clasp releasably coupling a pair of ends of the bracelet to each other, the clasp comprising:
    - a male member having a hole extending through the male member;
    - a female member receiving the male member, and
    - a lock member securing the male member to the female member, the lock member comprising a threaded fastener, the threaded fastener extending through the hole of the male member, the threaded fastener having exterior threads complementary in shape to interior threads of the female member such that the threaded fastener is rotatable to exit the hole of the male member; and
  - a power supply being electrically coupled to the RFID tag and being embedded within the bracelet, the power supply being a battery;
- a plurality of kiosks, each location marker of the plurality of location markers being in wireless communication with at least one kiosk of the plurality of kiosks, the RFID tag of each location marker transmitting identification signals to at least one kiosk of the plurality of kiosks, the plurality of kiosks being in communication with each other, each kiosk of the plurality of kiosks comprising:
  - a housing;
  - a processor being mounted to and positioned in the housing;
  - a transceiver being electrically coupled to the processor and being configured for wirelessly communicating with the RFID tag of each location marker of the plurality of location markers;
  - an input being electrically coupled to the processor and being positioned on an exterior of the housing, the input comprising a keypad;
  - a display screen being electrically coupled to the processor and being positioned on the exterior of the housing;
  - a sound emitter being electrically coupled to the processor and being positioned on the exterior of the housing; and
  - a dispensing mechanism being electrically coupled to the processor and being positioned in the housing, the housing containing a portion of the plurality of location markers, the dispensing mechanism selectively dispensing a selected location marker of the plurality of location markers;
- wherein the plurality of kiosks cooperatively determine a location of each location marker of the plurality of location markers via a location algorithm, the location algorithm comprising one of a choke point algorithm, a trilateration algorithm, and a triangulation algorithm;
- wherein a selected kiosk of the plurality of kiosks is operable to display a location of a chosen location marker of the plurality of location markers via the display screen of the selected kiosk; and
- wherein at least one kiosk of the plurality of kiosks emits an audible alarm via the sound emitter of the at least one kiosk when one location marker of the plurality of location markers exits a permitted region.

* * * * *